(12) United States Patent
Nakanishi

(10) Patent No.: US 7,710,662 B2
(45) Date of Patent: *May 4, 2010

(54) IMAGE PICKUP LENS AND IMAGE PICKUP DEVICE

(75) Inventor: Hitoshi Nakanishi, Kanangawa (JP)

(73) Assignee: Sony Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 12/222,331

(22) Filed: Aug. 7, 2008

(65) Prior Publication Data

US 2008/0304166 A1 Dec. 11, 2008

Related U.S. Application Data

(63) Continuation of application No. 11/666,356, filed as application No. PCT/JP2005/021882 on Nov. 29, 2005, now Pat. No. 7,423,817.

(30) Foreign Application Priority Data

Dec. 24, 2004 (JP) ............................. 2004-373721

(51) Int. Cl.
*G02B 3/02* (2006.01)
*G02B 9/14* (2006.01)

(52) U.S. Cl. .................. 359/716; 359/740; 359/785

(58) Field of Classification Search ................ 359/716, 359/740, 785
See application file for complete search history.

(56) References Cited

U.S. PATENT DOCUMENTS 6,927,925 B2 8/2005 Amanai
6,930,841 B2 8/2005 Sato
6,961,191 B2 11/2005 Sato
7,012,765 B2 3/2006 Matsui et al.
7,072,123 B2 7/2006 Noda
7,423,817 B2 * 9/2008 Nakanishi ................... 359/716

(Continued)

FOREIGN PATENT DOCUMENTS

JP 11-052227 2/1999

(Continued)

OTHER PUBLICATIONS

Japanese Office Action dated Dec. 4, 2007 for corresponding Japanese Patent Applicatin No. 2004-373721.

(Continued)

*Primary Examiner*—Evelyn A. Lester
(74) *Attorney, Agent, or Firm*—Rader, Fishman & Grauer PLLC

(57) ABSTRACT

In an image pickup lens 1 composed three glass lenses, the glass lenses are composed of a first lens L1 having a convex surface facing a subject side and positive refracting power, an aperture S, a second lens L2 having a convex surface facing an image side and negative refracting power, and a third lens L3 having a concave surface facing the image side and positive refracting power which are disposed sequentially from the subject side as well as all the lens surfaces are composed of aspheric surfaces and the following conditional formulas (A0) and (A1) are satisfied.

$$f/f2 < -0.9 \quad (A0)$$

$$2 < |R21+R22|/|R21-R22| < 5 \quad (A1)$$

With this arrangement, there is provided a compact and less expensive image pickup lens having a good optical performance and used to a solid image pickup device and an image pickup device using the image pickup lens.

8 Claims, 7 Drawing Sheets

U.S. PATENT DOCUMENTS

| | | |
|---|---|---|
| 2004/0150893 A1 | 8/2004 | Shinohara |
| 2004/0212901 A1 | 10/2004 | Nanba et al. |
| 2005/0117047 A1 | 6/2005 | Isono |

FOREIGN PATENT DOCUMENTS

| | | |
|---|---|---|
| JP | 2001-272598 | 10/2001 |
| JP | 2004-163786 | 6/2004 |
| JP | 2004-163851 | 6/2004 |
| JP | 2004-163876 | 6/2004 |
| JP | 2004-226487 | 8/2004 |
| JP | 2004-295112 | 10/2004 |
| JP | 2005-202019 | 7/2005 |
| JP | 2006-106321 | 4/2006 |

OTHER PUBLICATIONS

Japanese Office Action dated Mar. 4, 2008 for corresponding Japanese Patent Application No. 2004-373721.

Extended European Search Report dated Jun. 10, 2008 for corresponding European Application No. 05 81 1220.

* cited by examiner

IMAGE PICKUP LENS AND IMAGE PICKUP DEVICE

CROSS REFERENCE TO RELATED APPLICATIONS

This application is a Continuation Application of the patent application Ser. No. 11/666,356, filed Apr. 26, 2007, now U.S. Pat. No. 7,423,817 issued on Sep. 9, 2008, which is based on a national stage application of PCT/JP2005/021882, filed Nov. 29, 2005, which in turn claims priority from Japanese Application No.: 2004-373721, filed Dec. 24, 2004, the entire contents of which are incorporated herein by reference.

TECHNICAL FIELD

The present invention relates to a novel image pickup lens and image pickup device. More particularly, the present invention relates to a small image pickup lens suitable for digital input equipment (digital still camera, digital video camera, and the like) for capturing an image of a subject by a solid state image pickup device and to an image pickup device using the image pickup lens.

BACKGROUND ART

Recently, as a personal computer and the like have become widespread, a digital still camera, digital video camera, and the like (hereinafter, simply referred to as "digital camera") that can easily capture image information to digital equipment have entered a period of proliferation targeting at individual users. It is anticipated that such digital cameras will be widely diffused hereafter as image information input equipment.

Further, since solid state image pickup devices such as a CCD (Charge Coupled Device), a CMOS (Complementary Metal-Oxide Semiconductor), and the like make progress on the path to miniaturization, the digital camera is also required to reduce its size. Accordingly, it is strongly requested to make an image pickup lens, which occupies a maximum space in the digital input equipment, compact. The easiest method to reduce the size of the image pickup lens, is to miniaturize the solid state image pickup device. But, to miniaturize the solid state image pickup device, a light receiving device must be miniaturized, which makes it more difficult to manufacture the solid state image pickup device. Furthermore, miniaturization of the image pickup lens inevitably requires sophisticated performance.

In contrast, when the size of the image pickup lens is reduced while maintaining the size of the solid state image pickup device unchanged, the position of an exit pupil inevitably gets nearer to an image surface. When the position of the exit pupil gets nearer to the image surface, since off-axial light beams emitted from the image pickup lens are obliquely incident on the image surface at a large angle, the light converging performance of a microlens (array) disposed on the front surface of the solid state image pickup device cannot be sufficiently exhibited, from which a problem arises in that the brightness of an image is extremely different between the central portion of the image and the peripheral portion thereof. When it is intended to dispose the exit pupil of the image pickup lens at a far position to solve the problem, the size of image pickup lens cannot help being increased in its entirety.

Further, it is also strongly requested to reduce the cost of the image pickup lens due to recent price lowering competition. To cope with the above requests, there is proposed an image pickup lens composed of three lenses (disclosed in, for example, Patent Document 1 (Japanese Unexamined Patent Application Publication No. 2001-272598), Patent Document 2 (Japanese Unexamined Patent Application Publication No. 2004-163849), and Patent Document 3 (Japanese Unexamined Patent Application Publication No. 11-52227).

DISCLOSURE OF THE INVENTION

Incidentally, any of the image pickup lenses disclosed in Patent Documents 1 to 3 does not satisfy the above requests.

That is, an image pickup lens composed of the three lenses disclosed in Patent Document 1 is not compact because the entire length thereof is 3 times as long as a focal length. Although an image pickup lens disclosed in Patent Document 2 is compact, because it employs two plastic lenses, chromatic aberration cannot be sufficiently corrected. An image pickup lens disclosed in Patent Document 3 is not compact because the entire length thereof is 2.5 times as long as a focal length. Further, the image pickup lens has a view angle of about 40° which is insufficient when used as the image pickup lens.

An object of the present invention, which was made in view of the above circumstances, is to provide an image pickup lens for a solid state image pickup device which is excellent in an optical performance and less expensive, and an image pickup device using the image pickup lens.

To solve the above problems, in an image pickup lens of the present invention composed of three glass lenses, a first lens L1 having a convex surface facing a subject side and positive refracting power, an aperture S, a second lens L2 having a convex surface facing an image side and negative refracting power, and a third lens L3 having a concave surface facing the image side and having positive refracting power are disposed sequentially from the subject side as well as all the lens surfaces are composed of aspheric surfaces and f/f2<−0.9 of an conditional formula (A0) and 2<|R21+R22|/|R21−R22|<5 of a conditional formula (A1) are satisfied, where f shows the focal length of an overall lens system, f2 shows the focal length of a second lens L2, R21 shows the radius of curvature of the subject side lens surface of the second lens L2, and R22 shows the radius of curvature of the image surface side lens surface of the second lens L2.

Further, to solve the above problems, in an image pickup device composed of an image pickup lens and image pickup means for converting an optical image formed by the image pickup lens into an electronic signal, the image pickup lens is composed of three glass lenses, a first lens L1 having a convex surface facing a subject side and positive refracting power, an aperture S, a second lens L2 having a convex surface facing an image side and negative refracting power, and a third lens L3 having a concave surface facing the image side and having positive refracting power are disposed sequentially from the subject side as well as all the lens surfaces are composed of aspheric surfaces and f/f2<−0.9 of an conditional formula (A0) and 2<|R21+R22|/|R21−R22|<5 of a conditional formula (A1) are satisfied, where f shows the focal length of an overall lens system, f2 shows the focal length of a second lens L2, R21 shows the radius of curvature of the subject side lens surface of the second lens L2, and R22 shows the radius of curvature of the image surface side lens surface of the second lens L2.

Accordingly, the image pickup lens of the present invention can obtain a good optical performance as well as made compact at low cost. Further, the image pickup device of the present invention, using the image pickup lens, is made compact at low cost as well as able to obtain an image of high quality.

BEST MODE FOR CARRYING OUT THE INVENTION

A best mode for embodying an image pickup lens and an image pickup device of the present invention will be explained below with reference to the accompanying drawings.

Figure 1:
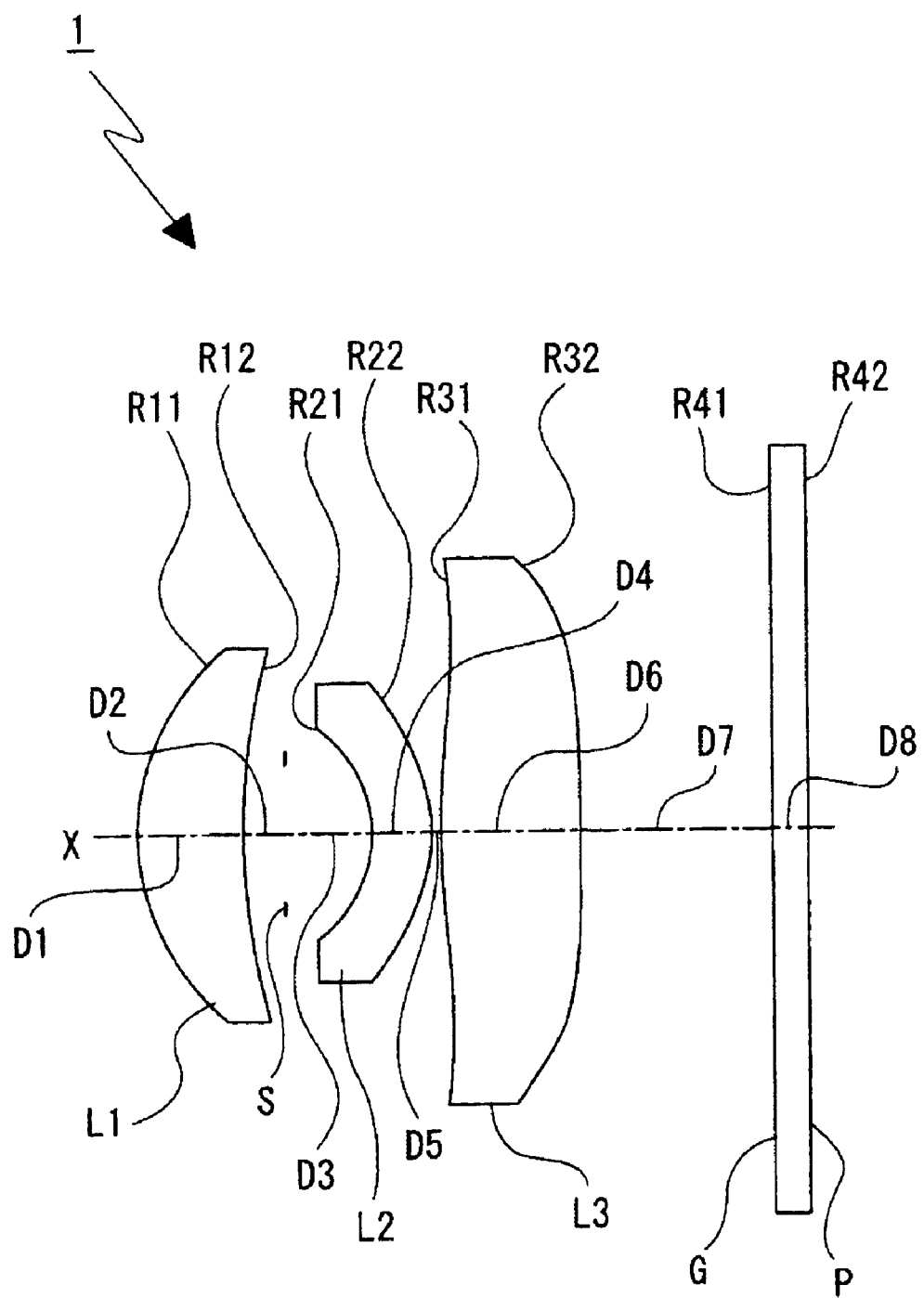
FIG. 1 is a view showing a lens arrangement of a first embodiment of an image pickup lens of the present invention.
Figure 2:
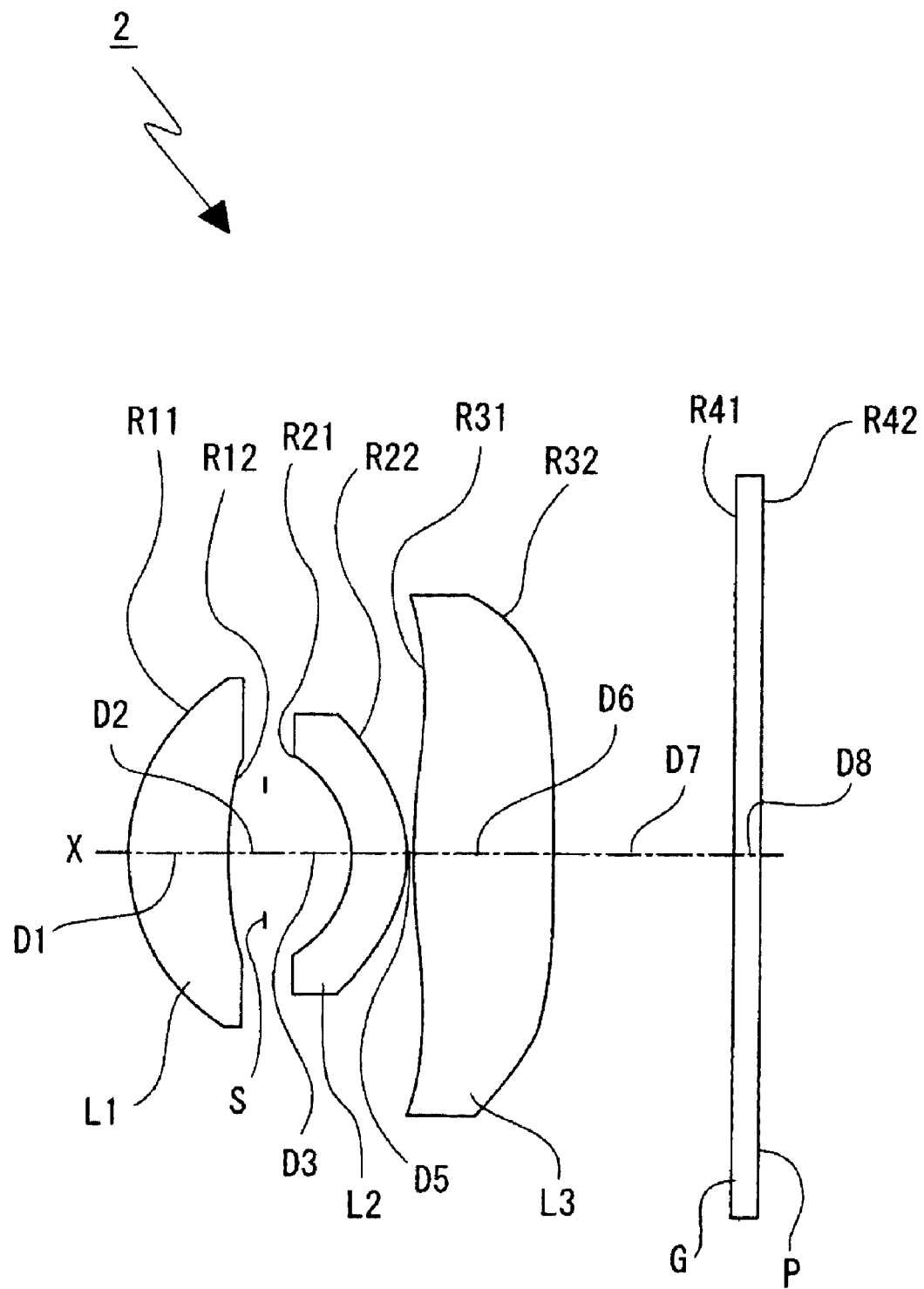
FIG. 2 is a view showing a lens arrangement of a second embodiment of the image pickup lens of the present invention

As shown in FIGS. 1 and 2, in each of the image pickup lenses 1, 2 of the present invention, a first lens L1 having positive refracting power, an aperture S, a second lens L2 having negative refracting power, and a third lens L3 having positive refracting power are sequentially disposed from a subject side so that a light beam can be effectively converged at an imaging position P on a glass sheet G. All the surfaces constituting the first lens L1, the second lens L2, and the third lens L3 are composed of aspheric surfaces. Then, the image pickup lenses 1, 2 of the present invention are arranged to satisfy the following conditional formulas (A0), (A1).

$$f/f2 < -0.9 \quad (A0)$$

$$2 < |R21 + R22|/|R21 - R22| < 5 \quad (A1)$$

where,
f: focal length of the overall lens system
f2: focal length of the second lens L2
R21: radius of curvature of the subject side lens surface of the second lens L2
R22: radius of curvature of the image surface side lens surface of the second lens L2

In the arrangement of the image pickup lenses 1, 2 according to the present invention, because power is distributed in the sequence of positive power, negative power, and positive power from the subject side and the aperture S is interposed between the first lens L1 and the second lens L2, the image pickup lenses 1, 2 are arranged suitable to obtain a good optical performance as a single focus lens composed of three lenses. Further, with this arrangement, the distance from the imaging position to an exit pupil can be increased. As a result, the angle between the main beam of respective light beams emitted from the final surface of a lens system and an optical axis can be reduced, thereby the good optical performance can be obtained by preventing an incident angle to a solid state image pickup device from being made acute.

Further, the image pickup lenses 1, 2 according to the present invention can achieve a high performance by sufficiently correcting aberration by using the aspheric surface lenses on the overall surfaces as well as appropriately distributing the power despite the fact that they are composed of only the three lenses and have a simple lens arrangement. Note that the aspheric surface is shown by the following expression 1.

$$Z = \frac{(CURV)Y^2}{1 + (1 - (1+K)(CURV)^2 Y^2)^{1/2}} + (A)Y^4 + (B)Y^6 + (C)Y^8 + \ldots (N)Y^n \quad \text{[Expression 1]}$$

where,
Z: amount of sag
Y: height from the optical axis
K: circular cone constant
(CURV): curvature
A, B, C, ... N: aspheric surface coefficient The first lens L1 corrects comatic aberration through both the aspheric surfaces thereof. Since the aspheric surface of the first lens L1 on the image surface side thereof and the aspheric surface of the second lens L1 on the subject surface side thereof are located relatively near to the aperture S, they also correct spherical aberration. Further the third lens L3 corrects distortion and field curvature through both the aspheric surfaces thereof.

Further, when the image pickup lenses 1, 2 are provided with an automatic focusing function, the first to third lenses can be moved together on the optical axis X by increasing and decreasing a distance D7 between the third lens L3 and the cover glass sheet G.

In the image pickup lenses 1, 2, since the first lens L1 is disposed on the subject side and the second and third lenses L2 and L3 are disposed on the image surface side across the aperture S, a power balance condition and a manufacturing condition must be satisfied on the subject side and the image surface side of the aperture S.

The conditional formula (A0) relates to the first lens L1 and mainly prescribes a range of conditions for reducing deterioration of performance caused by a manufacturing error. When the first lens L1 is out of the range of the conditional formula (A0), the power of the first lens L1 becomes excessively strong. As a result, because various types of aberration occur in the second lens L2 in a large amount, and a significant burden is imposed on the first lens L1 to correct aberration, the performance of the first lens L1 is greatly deteriorated by the manufacturing error in that correction of the field curvature becomes difficult, and the like.

The conditional formula (A1) prescribes a surface shape of the second lens L2. It is preferable for the second lens L2 that has the negative refracting power to be formed to a meniscus shape with its subject side formed to a concave surface and further to have a surface shape within the range of the conditional formula (A1). When the second lens L2 has a value equal to or smaller than the lower limit value of the range, because the power of the second lens L2 becomes excessively strong, it is difficult to balance the power between the subject side and the image surface side of the aperture S, and thus, it is difficult to correct comatic aberration and field curvature. Further, when the second lens L2 has a value exceeding the upper limit value of the range, the power of the second lens L2 is reduced (when a glass material having the same refraction index is used). Therefore, it is necessary to increase the refraction index of a glass material to provide the second lens L2 with power necessary to balance the power between the subject side and the image surface side of the aperture S. Since the refraction index of the glass material has an upper limit, predetermined power must be obtained by a surface shape to provide the second lens L2 with the necessary power, and thus an upper limit value is set to the conditional formula (A1). That is, when the surface shape of the second lens L2 satisfies the conditional formula (A1), the power balance of the lenses located on the subject side and the image surface side across the aperture S can be enhanced.

It is preferable for the image pickup lenses 1, 2 of the present invention to satisfy conditional formulas (A2) to (A5) to achieve a higher performance.

It is preferable for the image pickup lenses 1, 2 to satisfy the conditional formulas (A2) to (A4) to correct chromatic aberration well as well as to overcome difficulty in manufacturing.

$$Nd2>1.7 \tag{A2}$$

$$50>vd1 \tag{A3}$$

$$27<vd2 \tag{A4}$$

where,

Nd2: refraction index of the second lens L2 on line d vd1: Abbe number of the first lens L1 on line d vd2: Abbe number of the second lens L2 on line d When the image pickup lenses 1, 2 exceed the range of the values of these conditional formulas (A2) to (A4), it is difficult for them to correct chromatic aberration. As to the refraction index Nd2 of the second lens L2, because the surfaces of the second lens L2 are required to have a radius of curvature that is not excessively small while providing the lens L2 with necessary power from a reason of manufacturing, a lower limit value is set to the conditional formula (A2). Further, the conditional formulas (A3) and (A4) prescribe the Abbe numbers vd1 and vd2 of the first lens L1 having the positive refracting power and the second lens L2 having the negative refracting power, thereby chromatic aberration can be well corrected.

Further, it is preferable that the image pickup lenses 1, 2 satisfy the conditional formula (A5).

$$0.7<f/f3<1.2 \tag{A5}$$

where, f3: focal length of the third lens L3

The conditional formula (A5) shows a range in which magnification chromatic aberration is balanced with comatic aberration. When the image pickup lenses 1, 2 have a value equal to or smaller than the lower limit value of the range, a large amount of magnification chromatic aberration occurs, whereas when it has a value exceeding the upper limit value thereof, the optical performance of the lenses is deteriorated because comatic aberration is deteriorated.

Next, a numerical embodiment of the image pickup lenses 1, 2 to which specific numerical values are applied will be explained.

As described above, in the image pickup lens 1 shown in FIG. 1, the first lens L1 composed of a meniscus lens that has a convex surface facing the subject side and positive refracting power, the aperture S, the second lens L2 composed of the negative lens having the concave surface facing the subject side, and the third lens L3 composed of a positive lens having a convex surface facing the subject side are disposed sequentially from the subject side, and all the lenses have an aspheric surface.

Table 1 shows focal length f, Fno, and view angle 2ω of a numerical embodiment 1 to which the specific numerical values of the image pickup lens 1 are applied in an upper portion. Further, Table 1 shows the values of radius of curvature R of respective lens surfaces, the thicknesses of the respective lenses at the centers thereof, and the thicknesses of air intervals between the respective lenses (hereinafter, they are generically referred to as axial surface intervals) D, the refraction indexes Nd of the respective lenses on a line d, and Abbe numbers vd in a middle portion. Note that the numerals of surface numbers are sequentially shown from the subject side. Further, Table 1 shows the values of aspheric surface coefficients A, B, C, . . . , N shown by Expression 1 showing the aspheric surfaces together with circular cone constants K in a lower portion.

TABLE 1 f = 4.95 Fno 2.85 2ω = 62.51

| | | R | D | Nd | vd |
|---|---|---|---|---|---|
| | 1 | 1.89474 | 0.963884 | 1.58313 | 59.9 |
| | 2 | 5.83313 | 0.273431 | | |
| STO: | | INFINITY | 0.798057 | | |
| | 4 | −1.17555 | 0.74489 | 1.82114 | 24.06 |
| | 5 | −2.15009 | 0.1 | | |
| | 6 | 3.38558 | 1.517494 | 1.6935 | 53.2 |
| | 7 | 325.838 | 2.030844 | | |
| | 8 | INFINITY | 0.3 | 1.56883 | 56.0 |
| IMG: | | INFINITY | | | |

| | | | | | | | | | | | |
|---|---|---|---|---|---|---|---|---|---|---|---|
| 1 | k | −0.68903 | A1 | 1.61E−02 | A2 | 1.47E−03 | A3 | 1.91E−03 | A4 | −1.01E−03 | |
| 2 | k | 25.40905 | A1 | −1.07E−02 | A2 | −2.74E−02 | A3 | 1.24E−02 | A4 | −1.10E−02 | |
| 4 | k | −1.49646 | A1 | −5.21E−03 | A2 | −2.17E−01 | A3 | 3.84E−01 | A4 | −3.47E−01 | |
| | | | A5 | 1.23E−01 | A6 | 2.27E−09 | A7 | 3.23E−10 | A8 | 3.80E−11 | |
| 5 | k | 0.853229 | A1 | −4.35E−02 | A2 | 4.61E−02 | A3 | −7.49E−03 | A4 | 3.09E−03 | |
| 6 | k | −36.386 | A1 | −2.26E−02 | A2 | 6.11E−03 | A3 | −6.14E−04 | A4 | 2.18E−05 | |
| 7 | k: | −149773.5 | A1 | −1.70E−02 | A2 | −8.60E−04 | A3 | 2.79E−04 | A4 | −1.26E−05 | |

Figure 3:
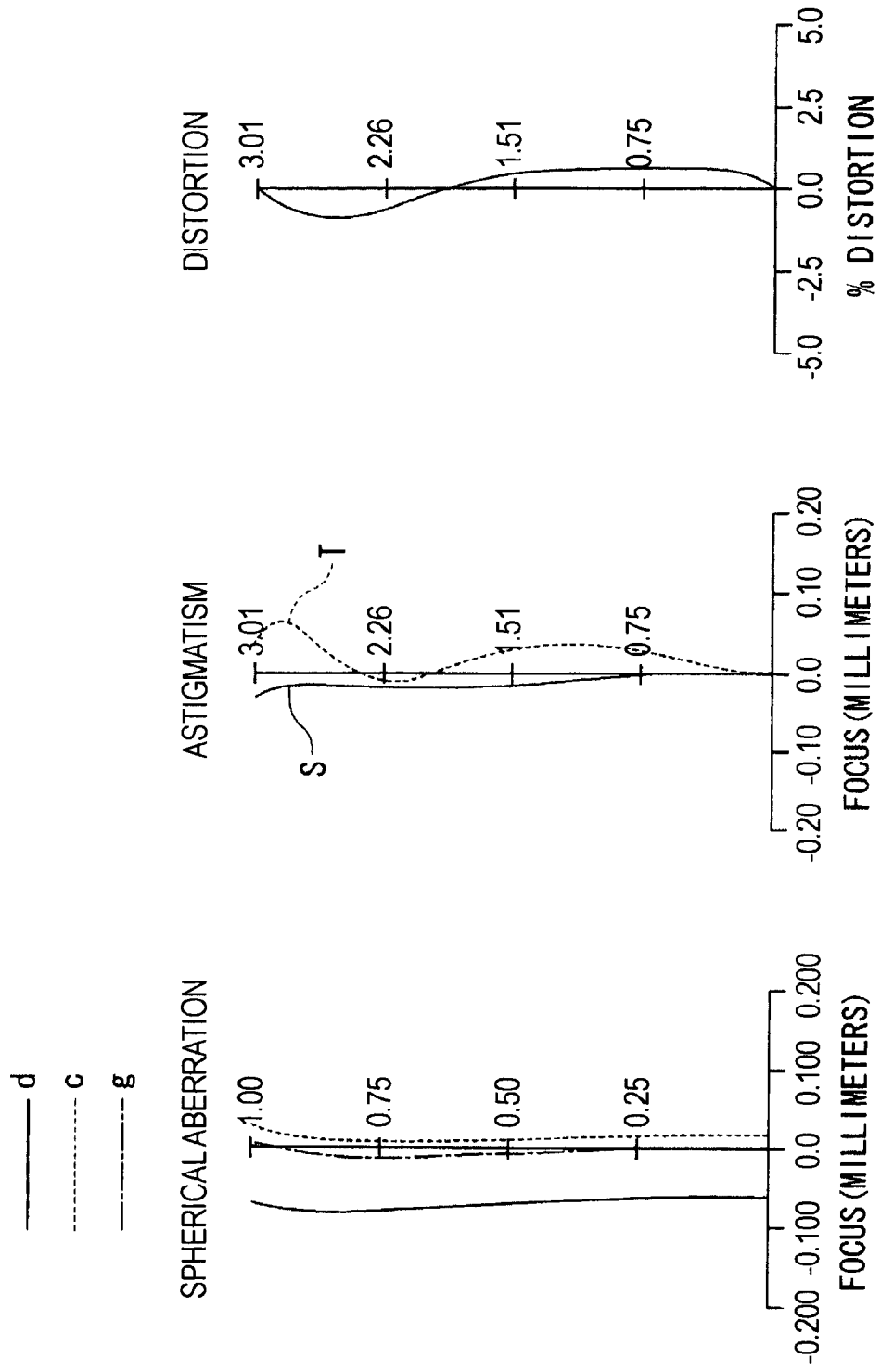
FIG. 3 is a view showing spherical aberration, astigmatism, and distortion of a numerical example 1 in which specific values are applied to the image pickup lens according to the first embodiment.

Respective parts of FIG. 3 are aberration views showing various types of aberration (spherical aberration, astigmatism, and distortion) of the numerical embodiment 1. Note that, in the astigmatism view, a solid line (S) shows aberration to a sagittal image surface, and a broken line (T) shows aberration to a tangential image surface. As apparent from these aberration views, according to the image pickup lens of the numerical embodiment 1, the respective types of aberration can be corrected well. Further, as shown in Table 3 described below, all the conditional formulas (A1) to (A5) can be satisfied. Since the aperture S is interposed between the first lens L1 and the second lens L2, the numerical embodiment 1 is made compact such that the distance from the first lens L1 including the aperture S to the third lens L3 is made short.

As described above, in the image pickup lens 2 shown in FIG. 2, the first lens L1 composed of a meniscus lens having a convex surface facing the subject side and positive refracting power, the aperture S, the second lens L2 composed of a negative lens having a concave surface facing the subject side, and the third lens L3 composed of a positive lens having a convex surface facing the subject side are disposed sequentially from the subject side, and all the lens surfaces are composed of an aspheric surface.

Table 2 shows focal length f, Fno, and view angle 2ω of a numerical embodiment 2 to which the specific numerical values of the image pickup lens 2 are applied in an upper portion. Further, Table 2 shows the values of radius of curvature R of respective lens surfaces, the thicknesses of the respective lenses at the centers thereof, and the thicknesses of air intervals between the respective lenses (hereinafter, they are generically referred to as axial surface intervals) D, the refraction indexes Nd of the respective lenses on a line d, and Abbe numbers νd in a middle portion. Note that the numerals of surface numbers are sequentially shown from the subject side. Further, Table 2 shows the values of aspheric surface coefficients A, B, C, . . . , N shown by Expression 1 showing the aspheric surfaces together with circular cone constants K in a lower portion.

tion views, according to the image pickup lens according to the numerical embodiment 2, the respective types of aberration can be well corrected. Further, as shown in Table 3, all the conditional formulas (A1) to (A5) can be satisfied. Since the aperture S is interposed between the first lens L1 and the second lens L2, the numerical embodiment 2 is made compact such that the distance from the first lens L1 including the aperture S to the third lens L3 is made short.

Table 3 shows the values corresponding to the respective conditional formulas (A0) to (A5) of the numerical embodiments 1 and 2.

TABLE 3

|    | Embodiment 1 | Embodiment 2 |
|----|--------------|--------------|
| A0 | −1.03421     | −1.0381      |
| A1 | 3.412523     | 3.92316      |
| A2 | 1.82114      | 1.82114      |
| A3 | 59.9         | 59.9         |
| A4 | 24.06        | 24.06        |
| A5 | 1.009857     | 1.07989      |

Figure 5:
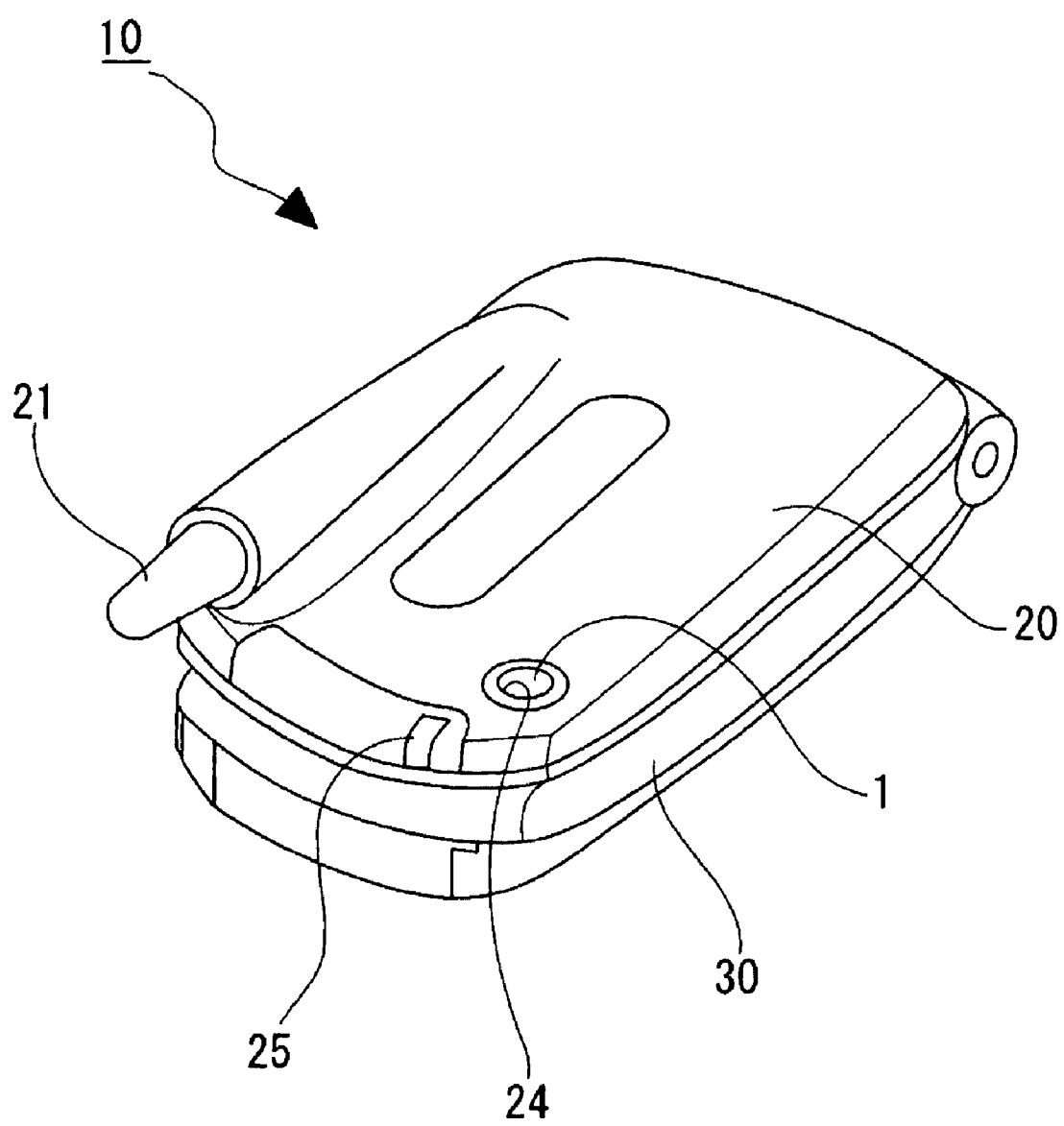
FIG. 5 shows an embodiment in which the image pickup device of the present invention is applied to a mobile phone together with FIGS. 6 and 7 and is a perspective view showing the outside appearance of the mobile phone when it is folded.
Figure 6:
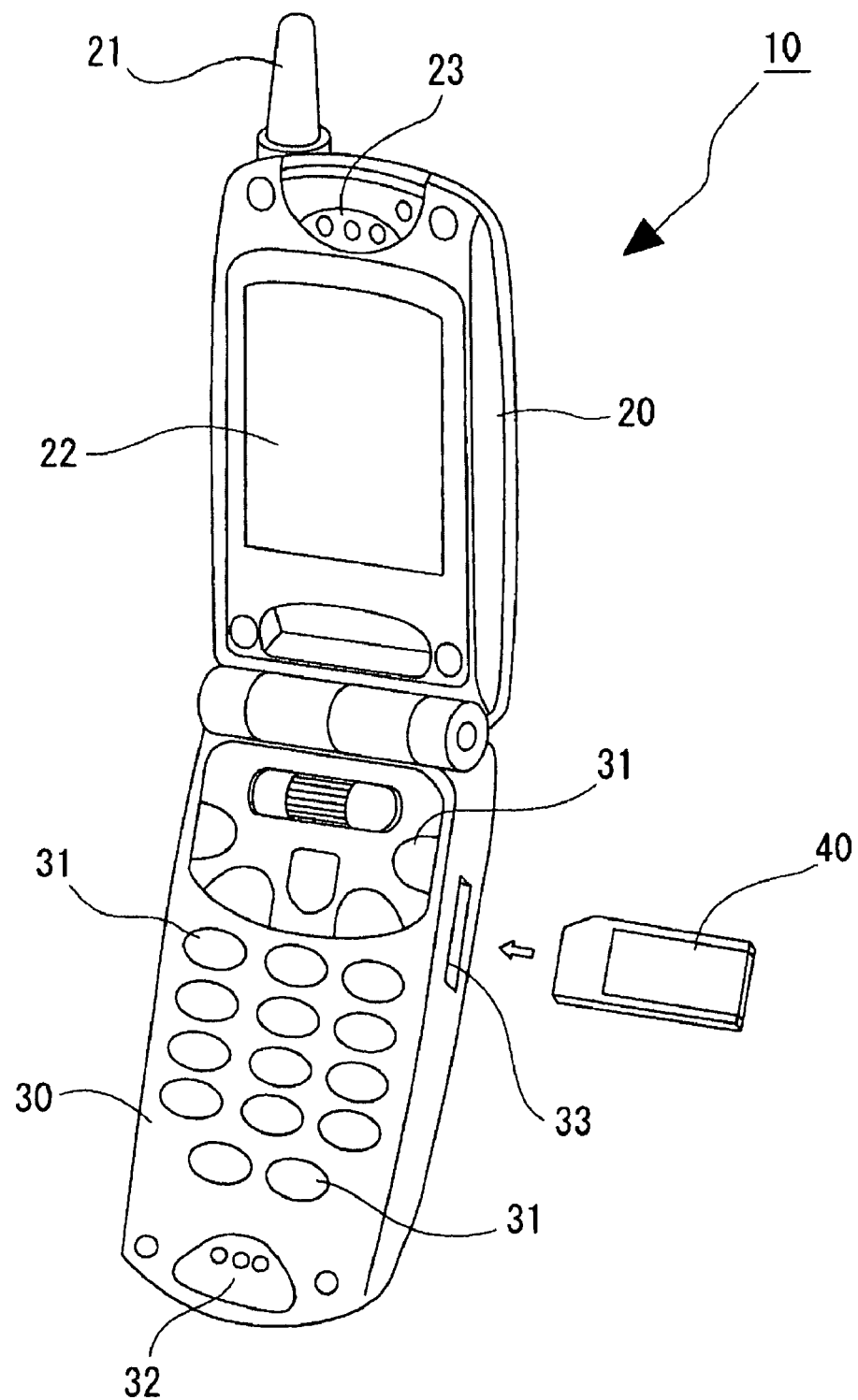
FIG. 6 is a perspective view showing how the mobile phone, to which the image pickup device of the present invention is applied, is used.
Figure 7:
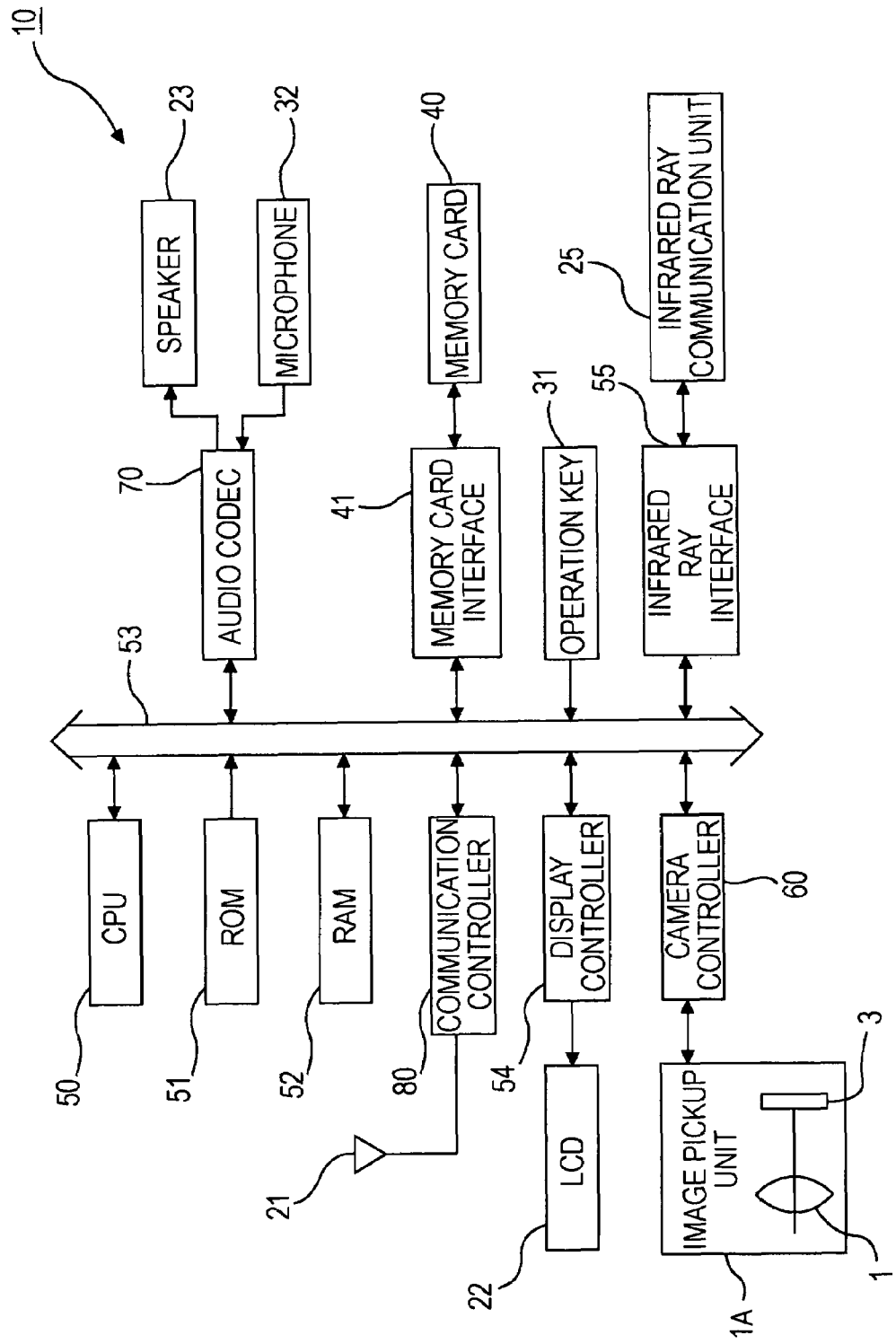
FIG. 7 is a block diagram showing the mobile phone to which the image pickup device of the present invention is applied.

Next, FIGS. 5 to 7 show an embodiment in which the image pickup device of the present invention is applied to a mobile phone.

FIGS. 5 and 6 show an outside appearance of the mobile phone 10.

The mobile phone 10 is composed of a display portion 20 and a main body portion 30 foldably coupled with each other through a hinge portion at a center. When the mobile phone 10 is carried, it is in a folded state, and when the mobile phone 10 is used for phone calls and the like, it is in an open state in which the display portion 20 is opened from the main body portion 30 as shown in FIG. 6.

The mobile phone 10 has an antenna 21 telecopically disposed at a position near to a side on the back surface of the display portion 20 in order to transmit and receive a radio wave to and from a base station. Further, a liquid crystal display panel 22 is disposed on the inner surface of the display

TABLE 2

| f = 4.95 Fno 2.85 2ω = 62.65 | | | | |
|---|---|---|---|---|
| | R | D | Nd | νd |
| 1 | 1.98177 | 1.077541 | 1.58313 | 59.9 |
| 2 | 5.29359 | 0.40946 | | |
| STO | INFINITY | 0.837823 | | |
| 4 | −1.11735 | 0.59787 | 1.82114 | 24.06 |
| 5 | −1.88183 | 0.1 | | |
| 6 | 3.59525 | 1.395897 | 1.76802 | 4924 |
| 7 | −182.862 | 1.978676 | | |
| 8 | INFINITY | 0.3 | 1.56883 | 56.0 |
| IMG: | INFINITY | 0 | | |

| | K | | A1 | | A2 | | A3 | | A4 | |
|---|---|---|---|---|---|---|---|---|---|---|
| 1 | K | −0.970328 | A1: | 0.151053E−01 | A2: | 0.273046E−02 | A3: | 0.998660E−05 | A4: | −.476089E−04 |
| 2 | K | 2.682678 | A1: | −.701473E−02 | A2: | −.121862E−02 | A3: | −.155074E−02 | A4: | 0.944552E−03 |
| 4 | K | −1.50085 | A1: | −.697111E−03 | A2: | −.184489E+00 | A3: | 0.185819E+00 | A4: | −.996023E−01 |
| 5 | K | −4.182068 | A1: | −.966697E−01 | A2: | 0.140262E−01 | A3: | 0.912990E−02 | A4: | −.239100E−02 |
| 6 | K | −25.85705 | A1: | −.256731E−01 | A2: | 0.547766E−02 | A3: | −.440708E−03 | A4: | 0.474186E−05 |
| 7 | K | −2.26E+27 | A1: | −.142380E−01 | A2: | −.210530E−02 | A3: | 0.523609E−03 | A4: | −.325722E−04 |

Figure 4:
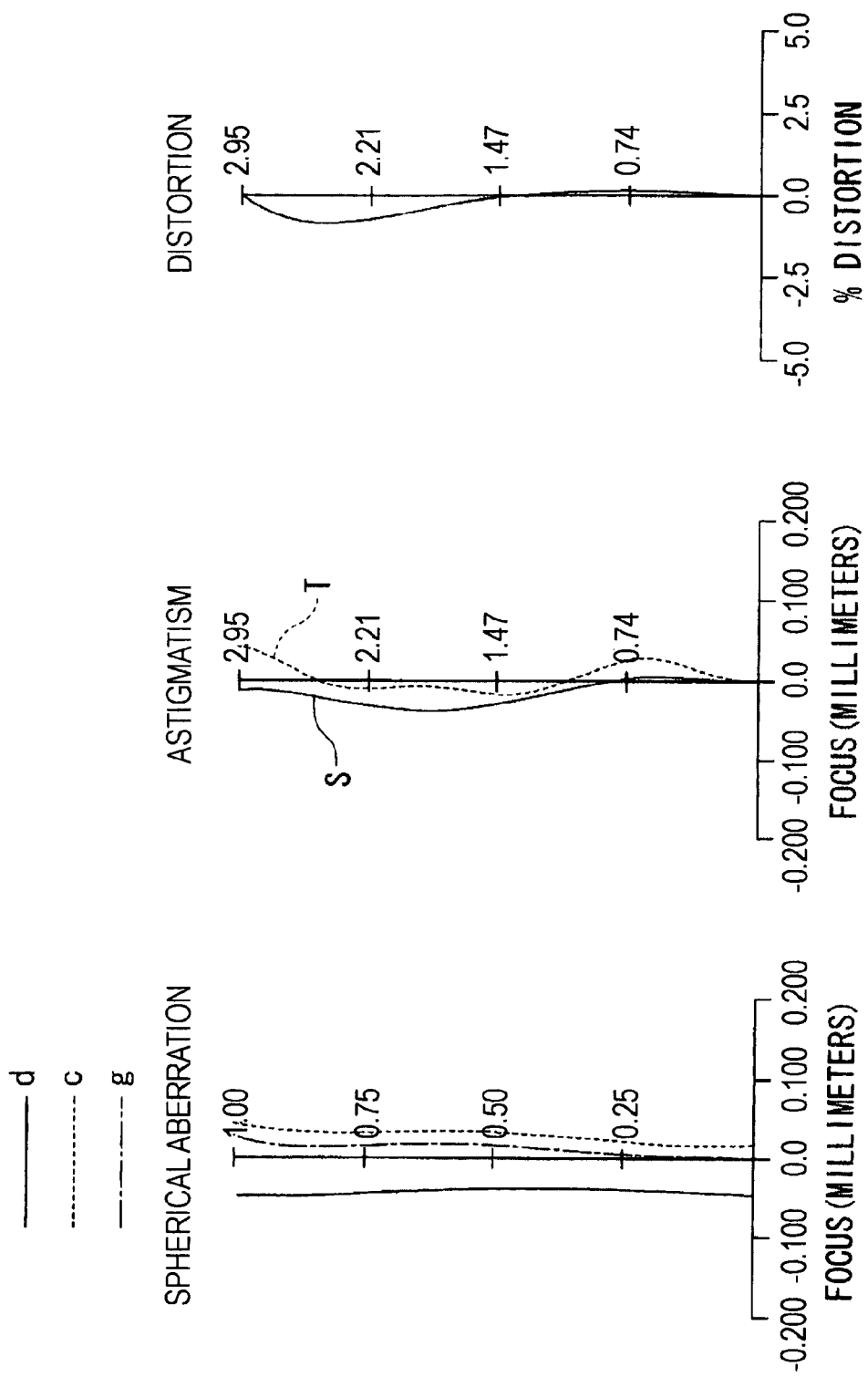
FIG. 4 is a view showing spherical aberration, astigmatism, and distortion of a numerical example 2 when specific values are applied to the image pickup lens according to the second embodiment.

Respective parts of FIG. 4 are aberration views showing various types of aberration (spherical aberration, astigmatism and distortion) of the numerical embodiment 2. Note that, in the astigmatism view, a solid line (S) shows aberration to a sagittal image surface, and a broken line (T) shows aberration to a tangential image surface. As apparent from these aberraportion 20 so as to occupy approximately entirely the inner surface, and a speaker 23 is disposed above the liquid crystal display panel 22. Further, an image pickup unit 1A of a digital camera is disposed to the display portion 20. An image pickup lens 1 (or an image pickup lens 2) of the image pickup unit 1A faces the outside through a view hole 24 formed on the back surface of the display portion 20. Note that the term "image pickup unit" used here means that it is composed of the image pickup lens 1 and an image pickup device 3. That is, the concept of the image pickup unit is used to make it clear that although the image pickup lens 1 and the image pickup device 3 must be disposed in the display portion 20 at the same time, the other components constituting the digital camera, for example, a camera controller, a recording medium, and the like may be disposed in a main body 30.

Further, an infrared communication unit 25 disposed at the extreme end of the display portion 20 includes an infrared ray emitting device and an infrared ray receiving device although they are not shown.

Operation keys 31, 31, such as numeral keys "0" to "9", a phone call key, a power supply key, and the like are disposed on the inner surface of the main body portion 30, and a microphone 32 is disposed below the portion in which the operation keys 31, 31, . . . are disposed. Further, a memory card slot 33 is disposed to a side surface of the main body portion 30, and a memory card 40 can be inserted into and removed from the main body portion 30 through the memory card slot 33.

FIG. 7 is a block diagram showing an arrangement of the mobile phone 10.

The mobile phone 10 has a CPU (Central Processing Unit) 50 for controlling the operation of the mobile phone 10 in its entirety. That is, the CPU 50 deploys a control program stored in a ROM (Read Only Memory) 51 to a RAM 52 (Random Access Memory) and control operation of the mobile phone 10 through a bus 53.

A camera controller 60 photographs images such as a still image, a motion picture, and the like by controlling the image pickup unit 1A composed of the image pickup lens 1 and the image pickup device 3 and places the thus obtained image information on the bus 53 after the image information is subjected to compression processing and the like to JPEG, MPEG, and the like. The image information placed on the bus 53 is temporarily stored to the RAM 52, output to a memory card interface 41 as necessary, and stored to the memory card 40 by the memory card interface 41 or displayed on the liquid crystal display panel 22 through a display controller 54. Further, audio information recorded through the microphone 32 simultaneously with the photographing is temporarily stored to the RAM 52 through an audio codec 70 together with the image information or stored to the memory card 40, and further output from the speaker 23 through the audio codec 70 simultaneously with the display of an image on the liquid crystal display panel 22. Further, the image information and the audio information are output to an infrared ray interface 55 when necessary, output to the outside by the infrared ray interface 55 through an infrared ray communication unit 25, and transmitted to equipment having a similar infrared ray communication unit to external equipment such as a mobile phone, personal computer, PDA (Personal Digital Assistance), and the like. Note that when a motion picture or a still image is displayed on the liquid crystal display panel 22 based on image information stored to the RAM 52 and the memory card 40, image data, which is obtained after a file stored to the RAM 52 and the memory card 40 is decoded and uncompressed by the camera controller 60, is transmitted to the display controller 54 through bus 53.

A communication controller 80 transmits and receives a radio wave to and from the base station through the antenna 21. In an audio call mode, the communication controller 80 outputs received audio information to the speaker 23 through the audio codec 70 after it is processed and further receives the audio information collected by the microphone 32 through the audio codec 70 and transmits it after it is processed.

Since the image pickup lens 1 (or the image pickup lens 2) can be arranged so as to have a short depth, it can be easily mounted on equipment such as the mobile phone 10 whose thickness is restricted. Note that although the above embodiment shows the example in which the image pickup device of the present invention is applied to the mobile phone, it is needless to say that the image pickup device can also be applied to information equipment other than a mobile phone, for example, a personal computer, PDA, and the like with a great advantage.

Note that since the specific structure, the shape, and the numerical values shown in the embodiment and the numerical embodiment are only examples employed when the present invention is embodied, the range of the technology of the present invention should not be interpreted.

The image pickup lens of the present invention is an image pickup lens composed of three glass lenses and characterized in that the first lens L1 having the convex surface facing the subject side and positive refracting power, the aperture S, the second lens L2 having the convex surface facing the image side and negative refracting power, and the third lens L3 having the concave surface facing the image side and positive refracting power are disposed sequentially from the subject side as well as all the lens surfaces are composed of the aspheric surface and the following conditional formulas (A0) and (A1) are satisfied.

$$f/f2 < -0.9 \tag{A0}$$

$$2 < |R21+R22|/|R21-R22| < 5 \tag{A1}$$

where, f: focal length of the overall lens system f2: focal length of the second lens L2

R21: radius of curvature of the subject side lens surface of the second lens L2

R22: radius of curvature of the image surface side lens surface of the second lens L2

Further, the image pickup device of the present invention is an image pickup device having an image pickup lens and an image pickup means for converting an optical image formed by the image pickup lens into an electronic signal and characterized in that the image pickup lens is composed of three glass lenses that are composed of a first lens L1 having a convex surface facing a subject side and positive refracting power, an aperture S, a second lens L2 having a convex surface facing an image side and negative refracting power, and a third lens L3 having a concave surface facing the image side and positive refracting power which are disposed sequentially from the subject side as well as all the lens surfaces are composed of aspheric surfaces and the following conditional formulas (A0) and (A1) are satisfied.

$$f/f2 < -0.9 \tag{A0}$$

$$2 < |R21+R22|/|R21-R22| < 5 \tag{A1}$$

where, f: focal length of the overall lens system f2: focal length of the second lens L2

R21: radius of curvature of the subject side lens surface of the second lens L2

R22: radius of curvature of the image surface side lens surface of the second lens L2

Accordingly, in the image pickup lens of the present invention, because the distance from the imaging position to the exit pupil can be increased, the incident angle to the solid image pickup device can be prevented from being made acute, thereby a good optical performance can be obtained. The image pickup lens can be made compact at low cost by the three-lens arrangement as well as has a high performance with aberration corrected sufficiently because all the lens surfaces are composed of the aspheric surface and the power is appropriately distributed. The image pickup lens can obtain a stable optical performance by reducing deterioration of performance caused by manufacturing error.

Further, the image pickup device of the present invention can be made compact at low cost by using the image pickup lens of the invention as well as can obtain an image of high quality.

Because the inventions according to claims 2 to 6 satisfy Nd2>1.7 of the conditional formula (A2), 50>vd1 of the conditional formula (A3), and 27<vd2 of the conditional formula (A4), where Nd2 shows refraction index on the line d of the second lens L2, vd1 shows Abbe number on the line d of the first lens L1, and vd2 shows Abbe number on the line d of the second lens L2, chromatic aberration can be well corrected. Further, the invention is advantageous in manufacturing because the radius of curvature of the lens surface of the second lens L2, in particular, the concave surface thereof is prevented from being made excessively small.

Since the inventions according to claims 3, 4, 7, and 8 satisfy $0.7<f/f3<1.2$ of the conditional formula (A5), they can correct chromatic aberration more well.

INDUSTRIAL APPLICABILITY

Since the image pickup lens of the present invention has a small size, and in particular, has a short overall length and a high performance, it can be preferably used to capture an image by small information equipment, for example, a mobile phone, PDA, personal computer, and the like.

The invention claimed is:

1. An image pickup lens comprising three lenses, characterized in that the three lenses comprise a first lens L1 having a convex surface facing a subject side and positive refracting power, an aperture S, a second lens L2 having a convex surface facing an image side and negative refracting power, and a third lens L3 having both the surfaces formed to a concave shape and positive refracting power which are disposed sequentially from the subject side as well as all the lens surfaces are composed of an aspheric surface and the following conditional formulas (A0) and (A1) are satisfied:

$$f/f2<-0.9 \tag{A0}$$

$$2<|R21+R22|/|R21-R22|<5 \tag{A1}$$

where,
f: focal length of overall lens system
f2: focal length of second lens L2
R21: radius of curvature of subject side lens surface of second lens L2
R22: radius of curvature of image surface side lens surface of second lens L2.

2. An image pickup lens according to claim 1, characterized in that the following conditional formulas (A2), (A3), and (A4) are satisfied:

$$Nd2>1.7 \tag{A2}$$

$$50>vd1 \tag{A3}$$

$$27<vd2 \tag{A4}$$

where,
Nd2: refraction index of second lens L2 on line d
vd1: Abbe number of first lens L1 on line d
vd2: Abbe number of second lens L2 on line d.

3. An image pickup lens according to claim 1, characterized in that the following conditional formula (A5) is satisfied:

$$0.7<f/f3<1.2 \tag{A5}$$

where,
f3: focal length of third lens L3.

4. An image pickup lens according to claim 2, characterized in that the following conditional formula (A5) is satisfied:

$$0.7<f/f3<1.2 \tag{A5}.$$

5. An image pickup device comprising an image pickup lens and image pickup means for converting an optical image formed by the image pickup lens into an electronic signal, characterized in that the image pickup lens comprises three glass lenses that comprise a first lens L1 having a convex surface facing a subject side and positive refracting power, an aperture S, a second lens L2 having a convex surface facing an image side and negative refracting power, and a third lens L3 having both the surfaces formed to a concave shape and positive refracting power which are disposed sequentially from the subject side as well as all the lens surfaces are composed of an aspheric surface and the following conditional formulas (A0) and (A1) are satisfied:

$$f/f2<-0.9 \tag{A0}$$

$$2<|R21+R22|/|R21-R22|<5 \tag{A1}$$

$$f/f2<-0.9 \tag{A0}$$

$$2<|R21+R22|/|R21-R22|<5 \tag{A1}$$

where,
f: focal length of overall lens system
f2: focal length of second lens L2
R21: radius of curvature of subject side lens surface of second lens L2
R22: radius of curvature of image surface side lens surface of second lens L2.

6. An image pickup device according to claim 5, characterized in that the following conditional formulas (A2), (A3), and (A4) are satisfied:

$$Nd2>1.7 \tag{A2}$$

$$50>vd1 \tag{A3}$$

$$27<vd2 \tag{A4}$$

where,
Nd2: refraction index of second lens L2 on line d
vd1: Abbe number of first lens L1 on line d
vd2: Abbe number of second lens L2 on line d.

7. An image pickup device according to claim 5, characterized in that the following conditional formula (A5) is satisfied:

$$0.7<f/f3<1.2 \tag{A5}.$$

where,
f3: focal length of third lens L3.

8. An image pickup device according to claim 6, characterized in that the following conditional formula (A5) is satisfied:

$$0.7<f/f3<1.2 \tag{A5}.$$

* * * * *